United States Patent [19]
Zander

[11] Patent Number: 5,930,541
[45] Date of Patent: *Jul. 27, 1999

[54] FILM GUIDE FOR GUIDING FILM LEADER OVER METERING SPROCKET IN CAMERA DEPLOYED WHEN DOOR TO CARTRIDGE RECEIVING CHAMBER OPENED

[75] Inventor: Dennis R. Zander, Penfield, N.Y.

[73] Assignee: Eastman Kodak Company, Rochester, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 08/878,917

[22] Filed: Jun. 19, 1997

[51] Int. Cl.$^6$ .............................. G03B 1/00; G03B 17/00
[52] U.S. Cl. ........................... 396/415; 396/440; 396/535
[58] Field of Search .................................... 396/395, 415, 396/440, 442, 535, 536

[56] References Cited

U.S. PATENT DOCUMENTS

| | | | |
|---|---|---|---|
| 3,377,936 | 4/1968 | Goshima et al. | 396/415 |
| 3,380,361 | 4/1968 | Winkler | 396/440 |
| 4,397,535 | 8/1983 | Harvey | 396/396 |
| 4,477,162 | 10/1984 | Matsumoto | 396/406 |
| 4,530,582 | 7/1985 | Hara et al. | 396/440 |
| 5,298,930 | 3/1994 | Asakura et al. | 396/418 |
| 5,394,213 | 2/1995 | Hazama et al. | 396/535 |
| 5,493,358 | 2/1996 | Janson, Jr. | 396/442 |

*Primary Examiner*—Eddie C. Lee
*Attorney, Agent, or Firm*—Roger A. Fields

[57] ABSTRACT

A camera comprising a cartridge receiving chamber for a film cartridge with a filmstrip including a film leader, a film takeup chamber, a backframe opening located between the cartridge receiving chamber and the film take-up chamber, a metering sprocket for engaging the filmstrip, and a film slit between the cartridge receiving chamber and the backframe opening to permit the film leader to be longitudinally inserted through the film slit from the cartridge receiving chamber across the backframe opening and to the film take-up chamber when the film cartridge is placed in the cartridge receiving chamber, is characterized in that a film guide is supported for movement in a first direction relative to the metering sprocket to be able to guide the film leader over the metering sprocket when the film leader is inserted through the film slit from the cartridge receiving chamber across the backframe opening and to the film take-up chamber and for movement in a reverse direction relative to the metering sprocket to be able to permit the metering sprocket to engage the filmstrip.

7 Claims, 4 Drawing Sheets

FILM GUIDE FOR GUIDING FILM LEADER OVER METERING SPROCKET IN CAMERA DEPLOYED WHEN DOOR TO CARTRIDGE RECEIVING CHAMBER OPENED

CROSS-REFERENCE TO RELATED APPLICATION

Reference is made to commonly assigned copending application Ser. No. 08/879,169, entitled FILM SUPPORT FOR GUIDING FILM LEADER OUT OF BACKFRAME OPENING IN CAMERA DEPLOYED WHEN DOOR TO CARTRIDGE RECEIVING CHAMBER OPENED and filed Jun. 19, 1997 in the name of Dennis R. Zander.

FIELD OF THE INVENTION

The invention relates generally to the field of photography, and in particular to cameras. More specifically, the invention relates to a film guide that is deployed for guiding a film leader over a metering sprocket in a camera when a door to a cartridge receiving chamber is opened.

BACKGROUND OF THE INVENTION

A conventional 35 mm film cartridge, such as manufactured by Eastman Kodak Company, comprises a light-tight housing and an unexposed filmstrip. The filmstrip is supported in a roll on a rotatable spool inside the light-tight housing and has a film leader that protrudes outwardly several inches through a light-trapping slit in the housing.

A typical camera intended to be used with the conventional 35 mm film cartridge includes a cartridge receiving chamber, a film take-up chamber, and a backframe opening. The backframe opening is located between the cartridge receiving chamber and the film take-up chamber, opposite a taking lens and a shutter, for exposing successive sections of the filmstrip (not including the protruding film leader). To load the film cartridge into the camera, a rear door of the camera is opened to uncover the cartridge receiving chamber, the backframe opening, and the film take-up chamber. Then the film cartridge is placed in the cartridge-receiving chamber and substantially simultaneously the protruding film leader is placed over the backframe opening and partway into the film take-up chamber. The protruding film leader is laid on one of a pair of parallel film rails at respective sides of the backframe opening, to be engaged by a metering sprocket which projects from an opening in the one rail. When the rear door is closed, the metering sprocket can be rotated in engagement with the filmstrip to advance successive sections of the filmstrip across the backframe opening.

Another camera to be used with the conventional 35 mm cartridge is disclosed in commonly assigned prior art U.S. Pat. No. 5,493,358 issued Feb. 20, 1996. The camera includes a cartridge receiving chamber, a film take-up chamber, and a backframe opening. A rear cover is fixed over the backframe opening and the film take-up chamber to prevent direct access to them. To load the film cartridge into the camera, a rear door independent of the rear cover is opened to uncover the cartridge receiving chamber. A light-trapping film slit is located between the cartridge receiving chamber and the backframe opening to permit the protruding film leader to be longitudinally inserted through the film slit from the cartridge receiving chamber across the backframe opening and to the film take-up chamber, as the film cartridge is placed in the cartridge receiving chamber. When the rear door is opened, it retracts a metering sprocket from an operative position for engaging the protruding film leader to permit the protruding film leader to be longitudinally inserted through the film slit from the cartridge receiving chamber across the backframe opening and to the film take-up chamber. Conversely, when the rear door is closed, it allows the metering sprocket to be returned via a spring to the operative position for engaging the filmstrip.

The Cross-Referenced Application

The cross-referenced application discloses a camera generally comprising a cartridge receiving chamber for a film cartridge with a filmstrip including a film leader, a film take-up chamber, a backframe opening located between the cartridge receiving chamber and the film take-up chamber, a film platen located over the backframe opening, a film slit between the cartridge receiving chamber and the backframe opening to permit the film leader to be longitudinally inserted through the film slit from the cartridge receiving chamber across the backframe opening and to the film take-up chamber when the film cartridge is placed in the cartridge receiving chamber, and a film support movable to a leader supporting position within the backframe frame opening to prevent the film leader from becoming jammed in the backframe opening and for guiding the film leader to the film take-up chamber. The camera is characterized in that the film platen is supported for movement in a first direction relative to the backframe opening to move the film support to its leader supporting position and for movement in a reverse direction relative to the backframe opening to retract the film support from its leader supporting position.

SUMMARY OF THE INVENTION

A camera comprising a cartridge receiving chamber for a film cartridge with a filmstrip including a film leader, a film takeup chamber, a backframe opening located between the cartridge receiving chamber and the film take-up chamber, a metering sprocket for engaging the filmstrip, and a film slit between the cartridge receiving chamber and the backframe opening to permit the film leader to be longitudinally inserted through the film slit from the cartridge receiving chamber across the backframe opening and to the film take-up chamber when the film cartridge is placed in the cartridge receiving chamber, is characterized in that:

a film guide is supported for movement in a first direction relative to the metering sprocket to be able to guide the film leader over the metering sprocket when the film leader is inserted through the film slit from the cartridge receiving chamber across the backframe opening and to the film take-up chamber and for movement in a reverse direction relative to the metering sprocket to be able to permit the metering sprocket to engage the filmstrip.

DETAILED DESCRIPTION OF THE INVENTION

The invention is disclosed as being embodied preferably in a camera. Because the features of a camera are generally known, the description which follows is directed in particular only to those elements forming part of or cooperating directly with the disclosed embodiment. It is to be understood, however, that other elements may take various forms known to a person of ordinary skill in the art.

Figure 1:
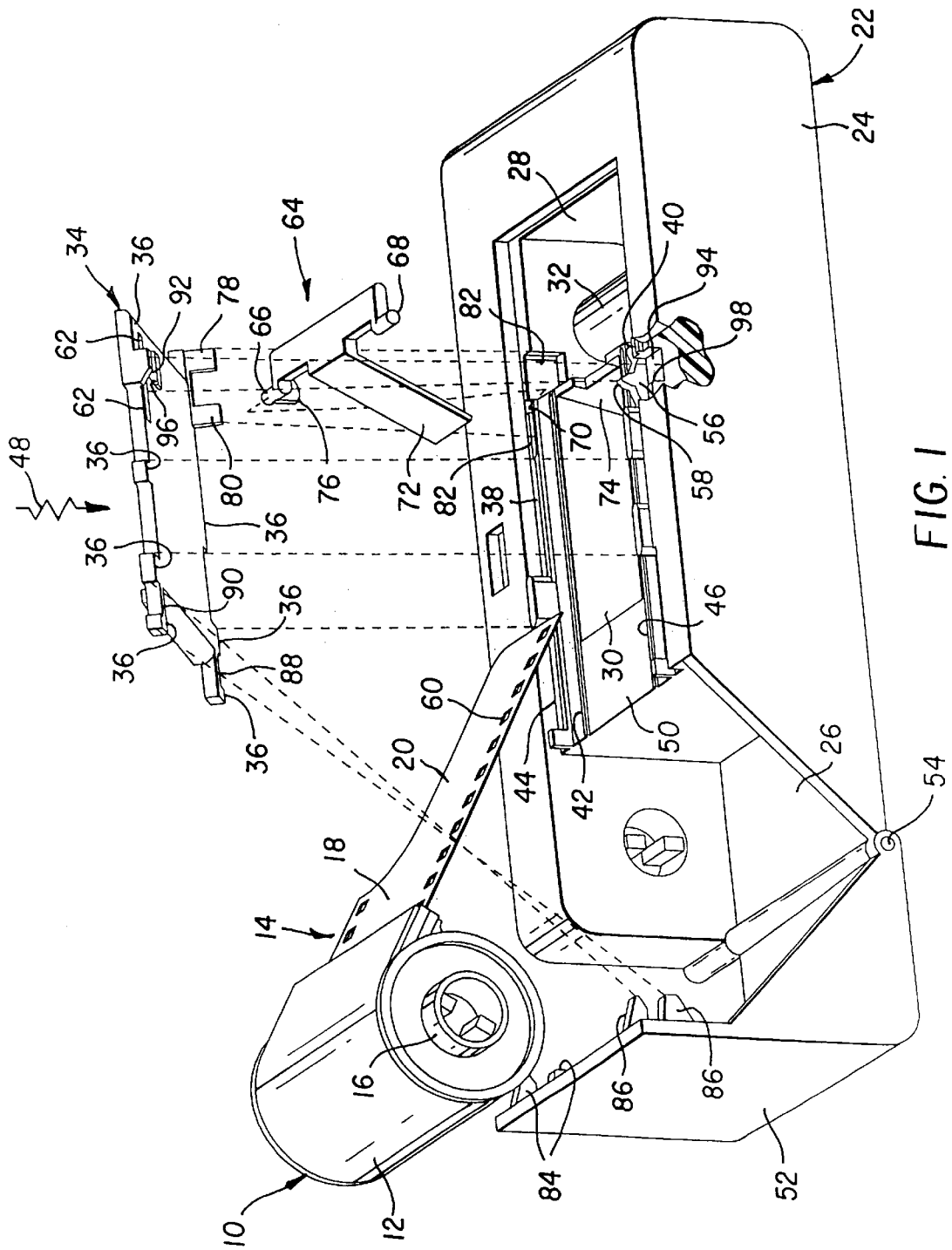
FIG. 1 is an exploded rear perspective view of a partially shown camera according to a preferred embodiment of the invention.
Figure 2:
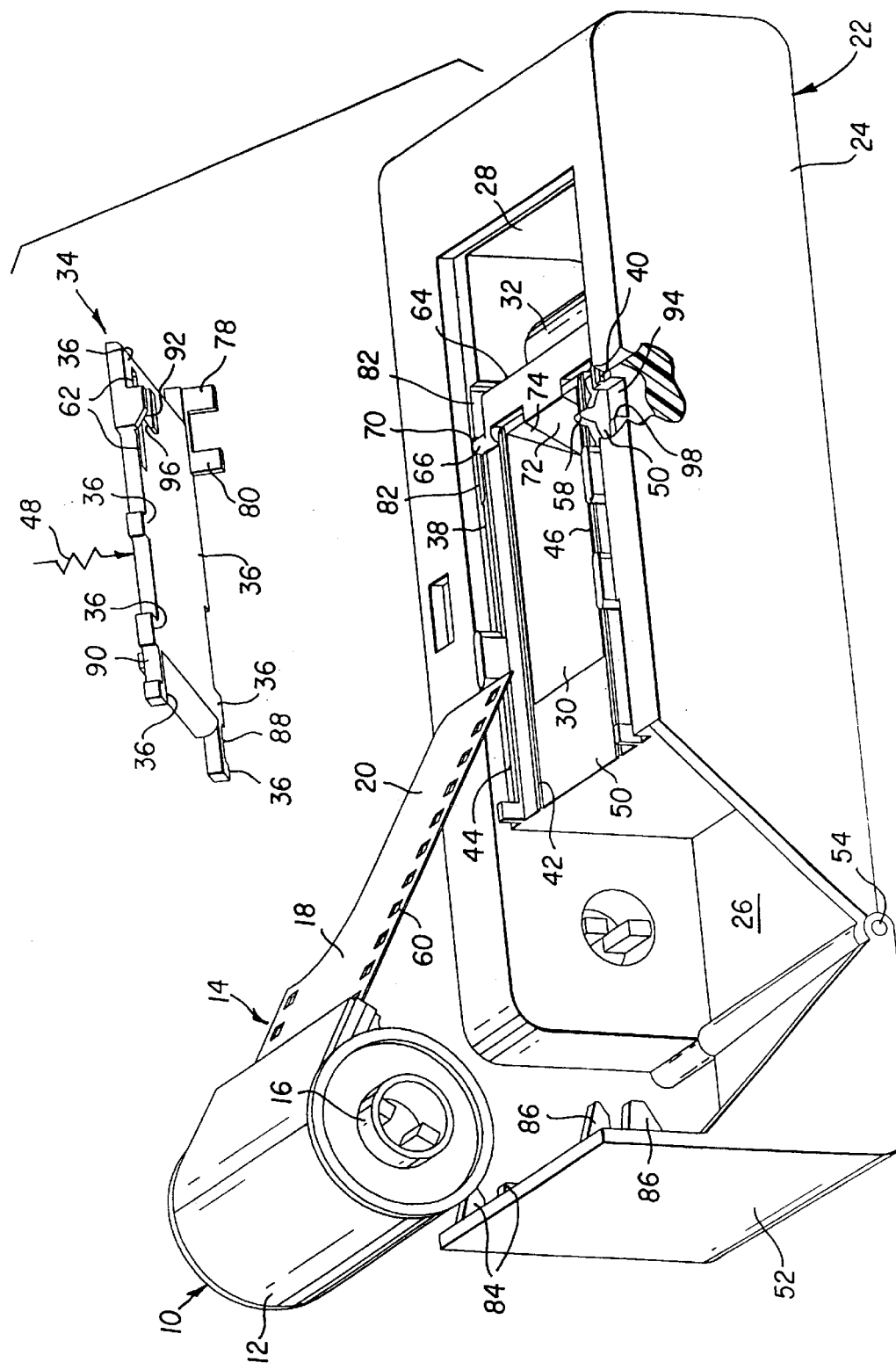
FIG. 2 is a partially assembled rear perspective view of the camera shown in FIG. 1

Referring now to the drawings, FIGS. 1 and 2 show a conventional 35 mm film cartridge 10, such as manufactured by Eastman Kodak Company, comprises a light-tight housing 12 and an unexposed filmstrip 14. The unexposed filmstrip 14 is supported in a roll on a rotatable spool 16 inside the light-tight housing 12 and has a film leader 18 that protrudes outwardly several inches through a light-trapping slit (not shown) in the housing. A forward-most portion 20 of the protruding leader 18 has a reduced width as compared to the remainder of the filmstrip 14.

A camera 22, partially shown in FIGS. 1 and 2, includes a body 24 having a cartridge receiving chamber 26, a film take-up chamber 28, and a backframe opening 30. The backframe opening 30 is located between the cartridge receiving chamber 26 and the film take-up chamber 28, opposite a taking lens and a shutter (not shown), for exposing successive sections of the filmstrip 14. A film take-up spool 32 is rotatable supported in the film take-up chamber 28.

A flat film support platen 34 has a number of protruding edge portions 36 that are supported on a pair of parallel ledges 38 and 40 (horizontal in FIG. 1) proximate respective sides of the backframe opening 30, for the film platen to cover the backframe opening. The ledge 38 is located between a film rail 42 (horizontal in FIG. 1) and a film edge guide 44 (vertical in FIG. 1), and the ledge 40 is located between a film rail 46 (horizontal in FIG. 1) and a film edge guide (not shown). The two film edge guides 44 and the two film rails 42 and 46 extend parallel to the two ledges 38 and 40.

A rear cover (not shown) similar to the one depicted in U.S. Pat. No. 5,493,358 issued Feb. 20, 1996 is fixed to the body 24 to cover the film platen 34 and the film take-up chamber 28 to prevent access to them. See FIGS. 1 and 2. A compression spring 48 lightly urges the edge portions 36 of the film platen 34 against the two ledges 38 and 40.

A light-trapping film slit 50 is located between the cartridge receiving chamber 26 and the backframe opening 30 to permit the protruding leader 18, beginning with its forward-most reduced width portion 20, to be longitudinally inserted through the film slit from the cartridge receiving chamber, across the backframe opening 30, along the two film rails 42 and 46, and to the film take-up chamber 28. This is done as the film cartridge 10 is placed in the cartridge receiving chamber 26. See FIGS. 1 and 2.

A rear door 52 to the cartridge receiving chamber 26 is pivotally connected to the body 24 at a pivot pin 54 for opening and closing movement to uncover and re-cover the cartridge receiving chamber. See FIGS. 1 and 2.

Figure 3:
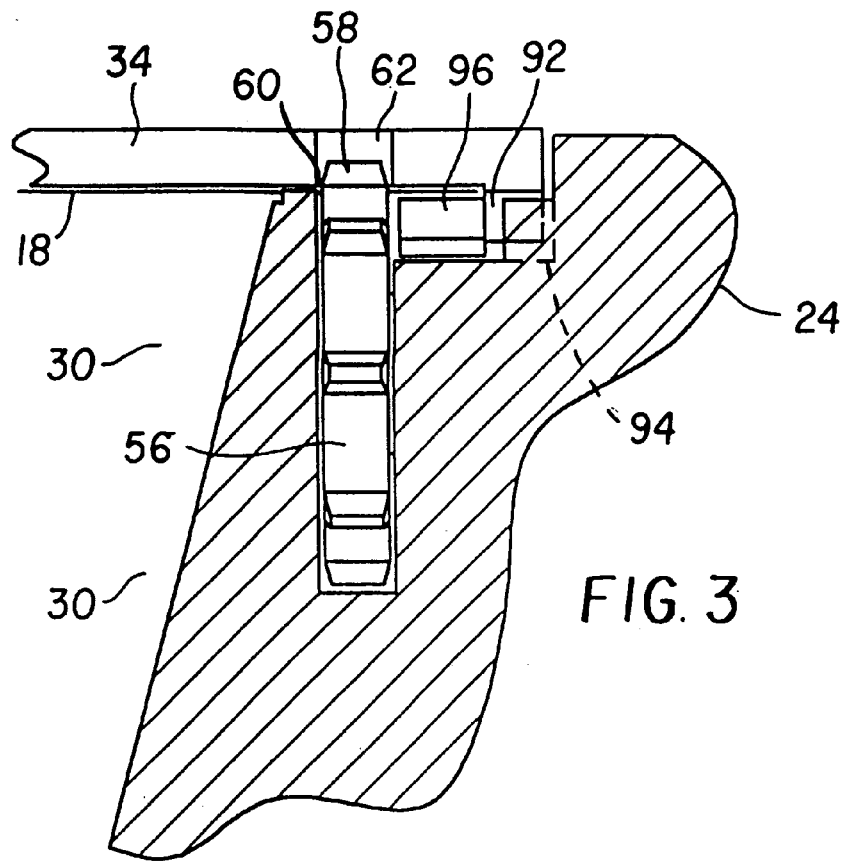
FIGS. 3 and 4 are elevation perspective views of a film guide, a metering sprocket and a film platen of the camera.

A rotatably supported metering sprocket 56 is located between the horizontal ledge 40 and the film rail 46, and has several teeth 58 for engaging the filmstrip 14 at respective perforations 60 in the filmstrip. See FIGS. 1 and 2. A slot 62 is arranged in the film platen 34 to receive successive ones of the teeth 58 as the metering sprocket 56 is rotated. See FIG. 3.

A film support 64 has a pair of coaxial end pins 66 and 68 that are received in respective pivot holes 70 (only one shown) in the body 24 to support the film support for pivotal movement, and a film ramp tongue 72 that extends into the backframe opening 30 to normally rest against an inclined wall 74 at one end of the backframe opening. See FIGS. 1, 2 and 5. A radial tab 76 that extends radially from the end pin 66 of the film support 64 is located between a pivot projection 78 and a return projection 80 of the film platen 34. The radial tab 76, the pivot projection 78 and the return projection are located within a side cavity 82 in the body 24 which is in line with the ledge 38.

Operation

The rear door 52 and the film platen 34 have complementary shaped, mating portions 84, 86 and 88, 90 which are similarly engaged (connected) when the rear door 52 is closed, to be able to pull (translate) the film platen 34 in a forward direction (to the left in FIGS. 1 and 2 and to the right in FIGS. 5 and 6) along the two ledges 38 and 40 when the rear door is initially opened and to then disengage (disconnect) when the rear door is further opened, and which re-engage (re-connect) when the rear door is partially closed, to be able to push (translate) the film platen in a reverse direction (to the right in FIGS. 1 and 2 and to the left in FIGS. 5 and 6) along the two ledges when the door is further closed.

Figure 5:
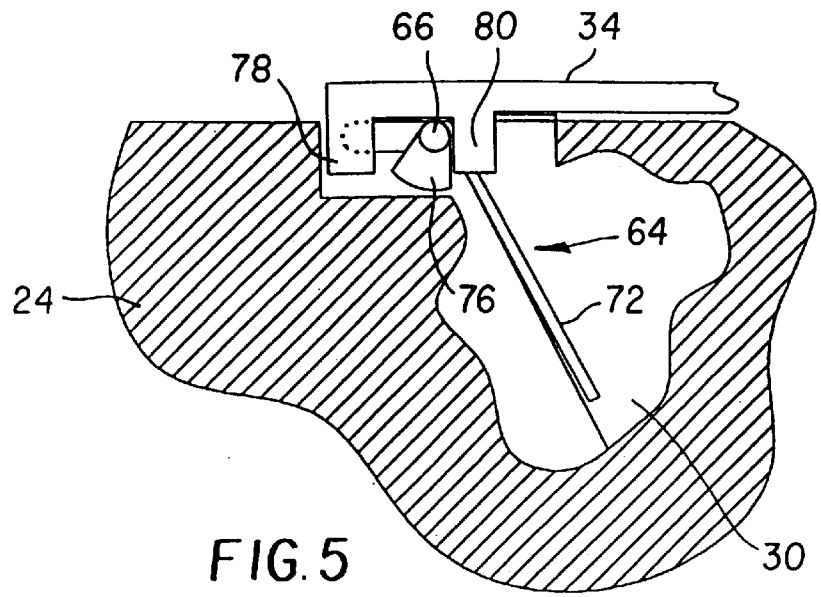
FIGS. 5 and 6 are elevation perspective views of a film support, the metering sprocket and the film platen of the camera.
Figure 6:
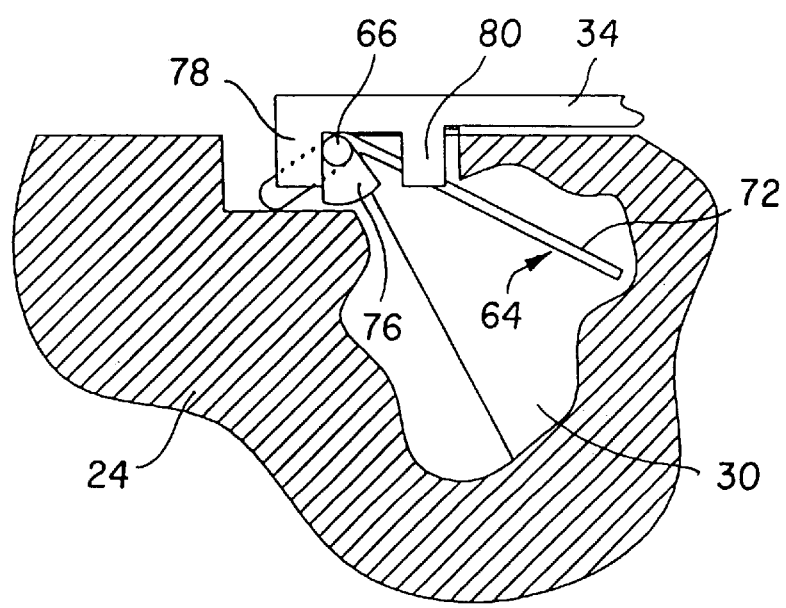

Consequently, when the rear door 52 is initially opened to pull (translate) the film platen 34 in a forward direction (to the left in FIGS. 1 and 2 and to the right in FIGS. 5 and 6) along the two ledges 38 and 40, the pivot projection 78 of the film platen 34 pushes against the radial tab 76 of the film support 64 to pivot the film support to swing its film ramp tongue 72 in a counter-clockwise direction in FIGS. 5 and 6 (and a clockwise direction in FIGS. 1 and 2) from against the inclined wall 74 to a leader supporting position shown in FIG. 6. The film ramp tongue 72, in the leader supporting position, is angled as shown in FIG. 6 to prevent the forward-most reduced width portion 20 of the protruding leader 18 from becoming jammed in the backframe opening 30 and for guiding the forward-most reduced width portion of the protruding leader to the film take-up chamber 28 when the protruding leader, beginning with its forward-most reduced width portion, is longitudinally inserted through the film slit 50 from the cartridge receiving chamber 26 across the backframe opening and to the film take-up chamber, as the film cartridge 10 is placed in the cartridge receiving chamber. Conversely, when the rear door 52 is further closed to push (translate) the film platen 34 in a reverse direction (to the right in FIGS. 1 and 2 and to the left in FIGS. 5 and 6) along the two ledges 38 and 40, the return projection 80 of the film platen 34 pushes against the radial tab 76 of the film support 64 to pivot the film support 64 to swing its film ramp tongue 72 in a clockwise direction in FIGS. 5 and 6 (and a counter-clockwise direction in FIGS. 1 and 2) from the leader supporting position to against the inclined wall 74. See FIG. 5.

Figure 4:
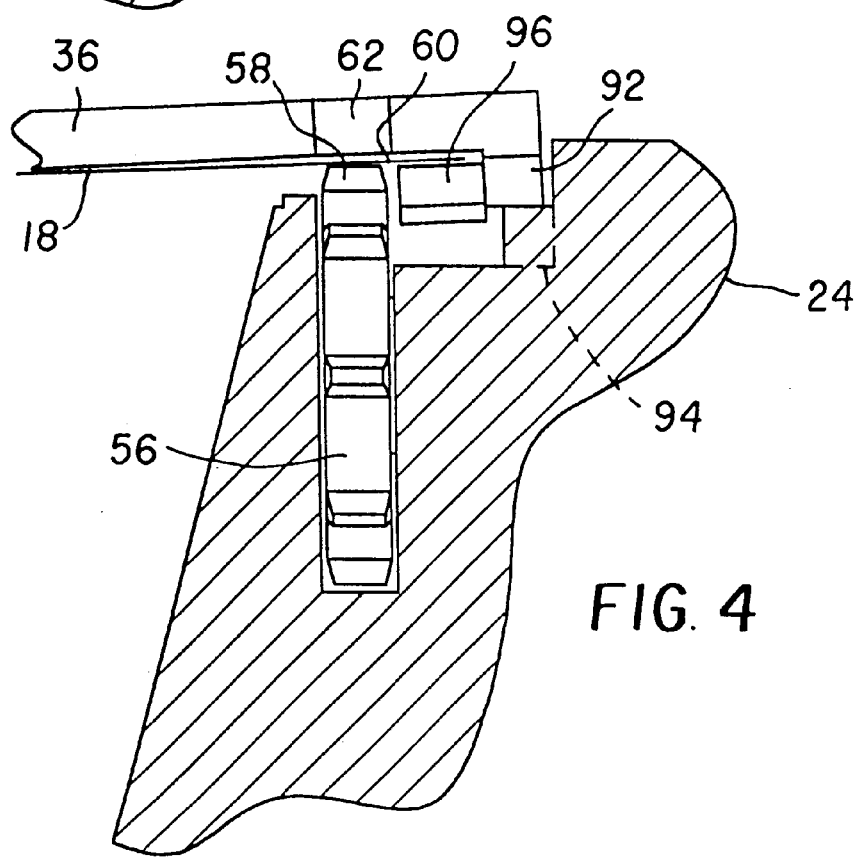

The film platen 34 has a protruding inclined cam 92 located in a side cavity 94 in the body 24 and an inclined film guide 96 located adjacent the metering sprocket 56. When the rear door 52 is initially opened to pull (translate) the film platen 34 in a forward direction (to the left in FIGS. 1 and 2 and to the right in FIGS. 5 and 6) along the two ledges 38 and 40, the inclined cam 92 is moved against a corner edge 98 of the side cavity 94 to elevate the film platen partially from the ledge 40 in the vicinity of the metering sprocket 56. Consequently, the slot 62 in the film platen 34 is separated from the teeth 58 of the metering sprocket 56 and the inclined film guide 96 is moved for the film guide to be able to guide the protruding leader 18, beginning with its forward-most reduced width portion 20, over (away from) the metering sprocket in order to prevent the protruding leader from becoming engaged with the metering sprocket when the protruding leader is inserted through the film slit 50 across the backframe opening 30 to the film take-up chamber 28, as the film cartridge 10 is placed in the cartridge receiving chamber 26. Conversely, when the rear door 52 is further closed to push (translate) the film platen 34 in a reverse direction (to the right in FIGS. 1 and 2 and to the left in FIGS. 5 and 6) along the two ledges 38 and 40, the compression spring 48 returns the film platen 34 to the ledge 40 in the vicinity of the metering sprocket 56, to return the slot 62 to the metering sprocket 56. This permits the teeth 58 of the metering sprocket 56 to engage the filmstrip 14 at the film perforations 60. See FIG. 4.

The invention has been described with reference to a preferred embodiment. However, it will be appreciated that variations and modifications can be effected by a person of ordinary skill in the art without departing from the scope of the invention.

PARTS LIST 10. film cartridge
12. light-tight housing
14. filmstrip
16. film spool
18. film leader
20. forward-most reduced width leader portion
22. camera
24. body
26. cartridge receiving chamber
28. film take-up chamber
30. backframe opening
32. film take-up spool
34. film platen
36. protruding edge portions
38. ledge
40. ledge
42. film rail
44. film edge guide
46. film rail
48. compression spring
50. film slit
52. rear door
54. pivot pin
56. metering sprocket
58. sprocket teeth
60. film perforations
62. slot
64. film support
66. end pin
68. end pin
70. pivot hole
72. film ramp tongue
74. inclined wall
76. radial tab
78. pivot projection
80. return projection
82. side cavity
84. complementary shaped, mating portion
86. complementary shaped, mating portion
88. complementary shaped, mating portion
90. complementary shaped, mating portion
92. inclined cam
94. side cavity
96. inclined film guide
98. corner edge

What is claimed is:

1. A camera comprising a cartridge receiving chamber for a film cartridge with a filmstrip including a film leader, a backframe opening, a metering sprocket for engaging the filmstrip, and a film slit arranged between said cartridge receiving chamber and said backframe opening to permit the film leader to be longitudinally inserted through said film slit from the cartridge receiving chamber to said backframe opening when the film cartridge is placed in the cartridge receiving chamber, is characterized in that:

a film guide is supported for movement in a first direction relative to said metering sprocket for said film guide to be able to guide the film leader over the metering sprocket in order to prevent the film leader from becoming engaged with the metering sprocket when the film leader is longitudinally inserted through said film slit from said cartridge receiving chamber to said backframe opening and for movement in a reverse direction relative to the metering sprocket to be able to permit the metering sprocket to engage the filmstrip.

2. A camera as recited in claim 1, wherein a door to said cartridge receiving chamber is engagingly connected with said film guide for said door to move the film guide in the first direction relative to said metering sprocket when said door is opened and to move the film guide in the reverse direction relative to the metering sprocket when the door is closed.

3. A camera as recited in claim 1, wherein said film guide protrudes from a film platen which is supported over said backframe opening to be moved to move the film guide in the first direction relative to said metering sprocket and in the reverse direction relative to the metering sprocket.

4. A camera as recited in claim 3, wherein said film guide is an inclined one which is inclined away from said film platen.

5. A camera as recited in claim 3, wherein a door to said cartridge receiving chamber is engagingly connected with said film platen for said door to move the film platen in order to move said film guide in the first direction relative to said metering sprocket when said door is opened and in order to move the film guide in the reverse direction relative to the metering sprocket when the door is closed.

6. A camera as recited in claim 5, wherein said film platen is supported on a pair of parallel ledges proximate respective sides of said backframe opening, and a cam is located on said film platen adjacent said film guide to lift the film platen partially from one of said ledges for said film guide to be moved in the first direction relative to said metering sprocket when said door is opened.

7. A camera as recited in claim 5, wherein said door is pivoted to be opened and closed, and said door and said film platen have complementary shaped portions which are engaged to be connected when the door is closed to pull the film platen for said film guide to be moved in the first direction relative to said metering sprocket when the door is initially opened and then disengage to be disconnected when the door is further opened and which re-engage to be re-connected when the door is partially closed to push the film for the film guide to be moved in the reverse direction relative to the metering sprocket when the door is further closed.

* * * * *